US009824479B2

(12) United States Patent
Bekmambetov et al.

(10) Patent No.: US 9,824,479 B2
(45) Date of Patent: Nov. 21, 2017

(54) METHOD OF ANIMATING MESSAGES (76) Inventors: Timur N. Bekmambetov, Moscow (RU); Sergei V. Kuzmin, Moscow (RU); Anton A. Novosyolov, Moscow (RU)

(*) Notice: Subject to any disclaimer, the term of this patent is extended or adjusted under 35 U.S.C. 154(b) by 356 days.

(21) Appl. No.: 13/812,802

(22) PCT Filed: Dec. 8, 2011

(86) PCT No.: PCT/RU2011/000966
§ 371 (c)(1),
(2), (4) Date: Apr. 22, 2014

(87) PCT Pub. No.: WO2013/085409
PCT Pub. Date: Jun. 13, 2013

(65) Prior Publication Data
US 2014/0225899 A1   Aug. 14, 2014

(51) Int. Cl.
*G06T 13/00* (2011.01)
*G06T 13/80* (2011.01)
(Continued)

(52) U.S. Cl.
CPC .......... *G06T 13/80* (2013.01); *G06F 17/248* (2013.01); *H04L 51/10* (2013.01); *H04L 51/38* (2013.01); *G06T 2213/12* (2013.01); *H04W 4/12* (2013.01)

(58) Field of Classification Search
CPC ... G06F 3/018; G06F 17/248; H04N 5/44504; G09G 5/40; G09G 5/246; G06T 11/203;
(Continued)

(56) References Cited

U.S. PATENT DOCUMENTS 6,009,397 A * 12/1999 Siegel ............... G06F 17/30017
434/156
6,047,300 A *  4/2000 Walfish ................. G06F 17/273
715/257

(Continued)

FOREIGN PATENT DOCUMENTS

EP           1274046 A1    1/2003

OTHER PUBLICATIONS

Int'l Search Report for PCT/RU2011/000966 dated Sep. 13, 2012.

*Primary Examiner* — Devona E Faulk
*Assistant Examiner* — Charles L Beard
(74) *Attorney, Agent, or Firm* — Patentagar PLLC; Alexander Rabinovich (57)   ABSTRACT

The present invention relates to rendering texts in a natural language, namely to manipulating a text in a natural language to generate an image or animation corresponding to this text. The invention is unique mainly in that a sequence of animations is selected, semantically corresponding to a given text. Given a set of animations and a text, the invention makes it possible to compare the sequence of these animations to this text. It is unique in that text templates are used and an optimum sequence of these templates is determined. The idea of the template-based text rendering consists in that the text is manipulated to generate an image or animation with the aid of searching correspondences to a limited number of predefined templates. An animation according to certain style is selected in compliance with each template. Animations are sequentially combined into a single sequence of video images.

9 Claims, 2 Drawing Sheets (51) Int. Cl.
*H04L 12/58* (2006.01)
*G06F 17/24* (2006.01)
*H04W 4/12* (2009.01)

(58) Field of Classification Search
CPC ......... G06T 11/60; G06T 13/80; H04L 51/10; H04L 51/38; G06K 9/4671; G06K 2209/01; G06K 9/481
See application file for complete search history.

(56) References Cited

U.S. PATENT DOCUMENTS

| | | | | |
|---|---|---|---|---|
| 6,970,859 | B1* | 11/2005 | Brechner | G06F 17/30017 |
| 7,165,068 | B2* | 1/2007 | Dedhia | G06F 17/30705 |
| | | | | 707/740 |
| 7,271,814 | B2* | 9/2007 | Anwar | G06T 11/60 |
| | | | | 345/629 |
| 7,272,419 | B1* | 9/2007 | Schutze | H04M 1/72547 |
| | | | | 455/412.1 |
| 7,349,946 | B2* | 3/2008 | Hirota | G06T 13/205 |
| | | | | 704/E21.02 |
| 7,453,464 | B1* | 11/2008 | Acquavella | G06T 11/60 |
| | | | | 345/471 |
| 7,512,537 | B2* | 3/2009 | Pahud | G06T 13/00 |
| | | | | 345/473 |
| 7,536,633 | B2* | 5/2009 | Faraday | G06F 3/0481 |
| | | | | 715/200 |
| 7,737,996 | B2* | 6/2010 | Gerhard | G06T 13/80 |
| | | | | 345/418 |
| 7,756,536 | B2 | 7/2010 | Camp, Jr. | |
| 7,860,335 | B2* | 12/2010 | Murata | G06T 7/2053 |
| | | | | 327/355 |
| 8,116,791 | B2* | 2/2012 | Agiv | G06F 17/214 |
| | | | | 455/466 |
| 8,156,186 | B2* | 4/2012 | Singh | G06Q 10/107 |
| | | | | 709/204 |
| 8,271,902 | B1* | 9/2012 | Mangini | H04M 1/72544 |
| | | | | 715/763 |
| 8,290,478 | B2* | 10/2012 | Shim | G06Q 10/107 |
| | | | | 455/412.1 |
| 8,463,594 | B2* | 6/2013 | Au | G06F 17/27 |
| | | | | 704/1 |
| 8,468,157 | B2* | 6/2013 | Saito | G06F 17/277 |
| | | | | 707/737 |
| 8,577,166 | B1* | 11/2013 | Ferguson | G06F 17/3089 |
| | | | | 382/255 |
| 8,762,128 | B1* | 6/2014 | Brants | G06F 17/2854 |
| | | | | 704/2 |
| 8,781,991 | B2* | 7/2014 | Lee | A61B 5/165 |
| | | | | 706/52 |
| 8,886,661 | B2* | 11/2014 | Mizuguchi | G06F 17/2775 |
| | | | | 704/9 |
| 8,977,983 | B2* | 3/2015 | Park | G06F 3/0236 |
| | | | | 715/810 |
| 9,037,982 | B2* | 5/2015 | Seo | G06F 17/211 |
| | | | | 715/706 |
| 9,152,979 | B2* | 10/2015 | Tew | G06Q 30/0251 |
| 9,154,456 | B2* | 10/2015 | Molina | H04L 51/10 |
| 9,230,035 | B2* | 1/2016 | Bao | G06F 17/3089 |
| 9,348,808 | B2 | 5/2016 | Kurabayashi | |
| 9,374,449 | B2* | 6/2016 | Kim | H04M 1/72555 |
| 9,401,097 | B2* | 7/2016 | Kim | G09B 19/00 |
| 9,430,738 | B1* | 8/2016 | Hui | G06N 5/022 |
| 9,436,756 | B2* | 9/2016 | Devkar | G06F 17/30029 |
| 9,449,418 | B2* | 9/2016 | Lee | G06F 3/041 |
| 9,472,013 | B2* | 10/2016 | Tobin | G06T 13/80 |
| 9,547,425 | B2* | 1/2017 | Wilson | G06F 3/04842 |
| 9,575,996 | B2* | 2/2017 | Yao | G06F 17/30268 |
| 9,589,200 | B2* | 3/2017 | Hoshi | G06K 9/00429 |
| 9,652,997 | B2* | 5/2017 | Oh | G09B 19/00 |
| 9,710,550 | B2* | 7/2017 | Krusell | G06F 17/30705 |
| 2002/0193996 | A1* | 12/2002 | Squibbs | H04M 1/72547 |
| | | | | 704/260 |
| 2003/0198386 | A1* | 10/2003 | Luo | G06K 9/325 |
| | | | | 382/199 |
| 2004/0027352 | A1* | 2/2004 | Minakuchi | G06T 13/80 |
| | | | | 345/473 |
| 2004/0205671 | A1* | 10/2004 | Sukehiro | G06F 17/2735 |
| | | | | 715/259 |
| 2005/0107127 | A1* | 5/2005 | Moriya | G06F 17/30265 |
| | | | | 455/566 |
| 2005/0171997 | A1* | 8/2005 | Seo | H04M 1/72544 |
| | | | | 709/202 |
| 2005/0193082 | A1* | 9/2005 | Burns | H04L 12/585 |
| | | | | 709/213 |
| 2005/0261032 | A1* | 11/2005 | Seo | A63F 13/12 |
| | | | | 455/566 |
| 2006/0066754 | A1* | 3/2006 | Zaima | G06F 17/214 |
| | | | | 348/564 |
| 2006/0197764 | A1* | 9/2006 | Yang | G06T 13/80 |
| | | | | 345/473 |
| 2007/0030273 | A1* | 2/2007 | Chen | G06T 13/00 |
| | | | | 345/473 |
| 2007/0037590 | A1* | 2/2007 | Lee | G06F 17/211 |
| | | | | 455/466 |
| 2007/0094330 | A1* | 4/2007 | Russell | G06Q 30/0277 |
| | | | | 709/206 |
| 2007/0101005 | A1* | 5/2007 | Shim | G06Q 10/107 |
| | | | | 709/227 |
| 2007/0171226 | A1* | 7/2007 | Gralley | G06T 13/80 |
| | | | | 345/473 |
| 2007/0208569 | A1* | 9/2007 | Subramanian | G10L 19/0018 |
| | | | | 704/270 |
| 2007/0213983 | A1* | 9/2007 | Ramsey | G10L 15/22 |
| | | | | 704/254 |
| 2007/0266090 | A1* | 11/2007 | Len | G06F 17/211 |
| | | | | 709/204 |
| 2008/0001950 | A1* | 1/2008 | Lin | G06T 13/80 |
| | | | | 345/473 |
| 2008/0170810 | A1* | 7/2008 | Wu | G06K 9/4671 |
| | | | | 382/305 |
| 2008/0182566 | A1* | 7/2008 | Camp, Jr. | H04L 51/38 |
| | | | | 455/418 |
| 2008/0216022 | A1* | 9/2008 | Lorch | G06F 3/04817 |
| | | | | 715/847 |
| 2008/0254779 | A1* | 10/2008 | Hwang | H04W 4/18 |
| | | | | 455/414.4 |
| 2008/0305775 | A1* | 12/2008 | Aaltonen | G06F 17/30905 |
| | | | | 455/412.1 |
| 2009/0024383 | A1* | 1/2009 | Shiratori | G06F 17/2836 |
| | | | | 704/4 |
| 2009/0024392 | A1* | 1/2009 | Koshinaka | G10L 15/06 |
| | | | | 704/257 |
| 2009/0106376 | A1* | 4/2009 | Tom | G06Q 10/107 |
| | | | | 709/206 |
| 2009/0246745 | A1* | 10/2009 | Snyder | G06Q 30/02 |
| | | | | 434/236 |
| 2009/0248399 | A1* | 10/2009 | Au | G06F 17/27 |
| | | | | 704/9 |
| 2009/0273613 | A1* | 11/2009 | Subherwal | G06T 3/4038 |
| | | | | 345/634 |
| 2009/0315895 | A1* | 12/2009 | Pahud | G06F 17/214 |
| | | | | 345/473 |
| 2009/0325609 | A1* | 12/2009 | Rosen | H04L 51/34 |
| | | | | 455/466 |
| 2010/0003969 | A1* | 1/2010 | Isobe | H04M 3/533 |
| | | | | 455/412.1 |
| 2010/0088616 | A1* | 4/2010 | Park | G06F 3/0236 |
| | | | | 715/762 |
| 2010/0100515 | A1* | 4/2010 | Bangalore | G06F 17/248 |
| | | | | 706/46 |
| 2010/0128042 | A1* | 5/2010 | Confrey | G06T 11/60 |
| | | | | 345/473 |
| 2010/0153376 | A1* | 6/2010 | Davidson | G06F 17/276 |
| | | | | 707/723 |
| 2010/0177116 | A1* | 7/2010 | Dahllof | G06F 3/011 |
| | | | | 345/619 |
| 2010/0179991 | A1* | 7/2010 | Lorch | H04M 1/7253 |
| | | | | 709/206 |

(56) References Cited

U.S. PATENT DOCUMENTS

| | | | |
|---|---|---|---|
| 2010/0298012 A1* | 11/2010 | Damarla | H04L 12/5895 455/466 |
| 2010/0302254 A1* | 12/2010 | Min | G06F 17/214 345/473 |
| 2011/0029902 A1* | 2/2011 | Bailey | G06F 21/36 715/764 |
| 2011/0069085 A1* | 3/2011 | Weber | G06T 11/60 345/620 |
| 2011/0081891 A1* | 4/2011 | Benninger | H04M 1/72569 455/412.2 |
| 2011/0093272 A1* | 4/2011 | Isobe | G10L 13/10 704/258 |
| 2011/0181604 A1* | 7/2011 | Lee | G06F 3/041 345/473 |
| 2011/0311140 A1* | 12/2011 | Urbach | G06K 9/00664 382/182 |
| 2012/0019446 A1* | 1/2012 | Wu | G06F 3/018 345/168 |
| 2012/0088527 A1* | 4/2012 | Roka | H04L 12/5855 455/466 |
| 2012/0149339 A1* | 6/2012 | Mulampaka | H04L 12/586 455/412.1 |
| 2012/0203776 A1* | 8/2012 | Nissan | G06F 17/30746 707/728 |
| 2012/0229388 A1* | 9/2012 | Oh | G06F 3/018 345/169 |
| 2012/0233633 A1* | 9/2012 | Nishikawa | H04H 60/33 725/12 |
| 2012/0260339 A1* | 10/2012 | Bhogal | G06F 21/552 726/23 |
| 2013/0052619 A1* | 2/2013 | Oh | G09B 19/00 434/236 |
| 2013/0060875 A1* | 3/2013 | Burnett | H04N 21/4788 709/206 |
| 2013/0103766 A1* | 4/2013 | Gupta | G06Q 10/107 709/206 |
| 2013/0151508 A1* | 6/2013 | Kurabayashi | G06F 17/2223 707/723 |
| 2013/0275525 A1* | 10/2013 | Molina | H04L 51/10 709/206 |
| 2014/0108004 A1* | 4/2014 | Sternby | G06F 17/242 704/9 |
| 2014/0136990 A1* | 5/2014 | Gonnen | H04L 51/18 715/752 |
| 2014/0156762 A1* | 6/2014 | Yuen | H04L 51/32 709/206 |
| 2014/0160134 A1* | 6/2014 | Bekmambetov | G06F 17/28 345/473 |
| 2014/0161356 A1* | 6/2014 | Tesch | H04L 51/063 382/196 |
| 2014/0163957 A1* | 6/2014 | Tesch | H04L 51/063 704/9 |
| 2014/0164507 A1* | 6/2014 | Tesch | H04L 51/10 709/204 |
| 2014/0330656 A1* | 11/2014 | Zhou | G06Q 20/322 705/16 |
| 2015/0006657 A1* | 1/2015 | Zhang | H04L 51/08 709/206 |
| 2015/0042662 A1* | 2/2015 | Latorre-Martinez | G10L 21/10 345/473 |
| 2015/0127453 A1* | 5/2015 | Tew | G06Q 30/0251 705/14.49 |
| 2015/0172246 A1* | 6/2015 | Velummylum | H04L 51/18 709/206 |
| 2015/0286371 A1* | 10/2015 | Degani | G06F 17/274 705/14.64 |
| 2015/0379336 A1* | 12/2015 | Hoshi | G06K 9/00429 382/187 |
| 2016/0035123 A1* | 2/2016 | Bonansea | G06T 13/80 345/473 |
| 2016/0154825 A1* | 6/2016 | Yao | G06F 17/30268 382/218 |
| 2016/0163219 A1* | 6/2016 | Russell | G06F 3/04842 434/178 |
| 2016/0259526 A1* | 9/2016 | Lee | G06F 3/04817 |
| 2016/0286028 A1* | 9/2016 | Ahuja | H04L 51/10 |
| 2016/0307028 A1* | 10/2016 | Fedorov | G06T 11/60 |
| 2017/0041272 A1* | 2/2017 | Chang | H04L 51/063 |
| 2017/0206697 A1* | 7/2017 | McKenzie | H04N 5/04 |

* cited by examiner

METHOD OF ANIMATING MESSAGES

CROSS-REFERENCE TO RELATED APPLICATIONS

This application is a U.S. National phase application of the International application PCT/RU2011/000966, filed Dec. 8, 2011, the entire contents of which International application being hereby incorporated by reference.

BACKGROUND OF THE INVENTION

1. Technical Field

The present invention relates to processing texts presented in a natural language, namely to converting a natural language text into an image or animation corresponding to this text. More particularly, the invention relates to implementation of the text processing based on templates.

2. Description of the Prior Art

Known have been various solutions enabling a text to be analyzed so that static images may be formed based on the analysis results.

Also, solutions exist, enabling scenes and animations to be created manually by drawing the objects, characters, scenes so that a two-dimensional (or even three-dimensional) animated clips or static images may be ultimately obtained.

No solutions are known which would provide for converting automatically a natural language text into an animated clip by algorithmically combining previously made animated clips into a set, which logically corresponds to the text in a natural language even if limited to a certain vocabulary or topics including, but not limited to, the use of the most commonly used words and phrases including colloquial ones.

SUMMARY OF THE INVENTION

The technical effect achievable from the use of the claimed invention lies in enhancing the range of technical capabilities as related to rendering a text written in a natural language (creating animations based on the text).

According to the first aspect of the present invention, a method is provided for animating an original text in a natural language, said method comprising the steps of:
  providing the original text in a natural language;
  dividing the text into sentences;
  dividing each sentence into words;
  reducing each word to a normalized form thus creating a normalized text out of the original natural language text;
  providing a set of text templates;
  selecting a sequence of the templates for each of the sentences of the normalized text;
  combining the sequence of the templates for each of the sentences seriated into a single common sequence of templates;
  providing a set of animation files;
  selecting at least one animation file of the set for each template of the common sequence of templates;
  combining the selected animation files into a resulting clip.

The method of animating an original text in a natural language can additionally comprise a formalized replacement of words, phrases and symbols with predefined words, phrases or symbols equivalent thereto.

The method of animating an original text in a natural language can additionally comprise correcting misprints in the words.

The method of animating an original text in a natural language can additionally comprise selecting neutral background animations for each template.

The method of animating an original text in a natural language can additionally comprise searching a cache for the sequence of templates corresponding to the normalized text and selecting the sequence of templates from the cache if found therein.

The method of animating an original text in a natural language according to the present invention can additionally provide assigning at least one style of animation to the original text when selecting animations for the common sequence of templates, the step of assigning comprising substeps of:
  providing a set of styles of animation;
  examining whether a style of animation of the set is predefined for the original text;
  selecting animations corresponding to the predefined style provided that an animation of each template from the common sequence of templates is available in the predefined style;
  selecting randomly the style of the set for which animations of each templates of the common sequence are available if no such style is predefined or there is more than one such style available; and
  selecting animations in various styles if no style with animations of each templates of the common sequence is available.

The method of animating an original text in a natural language can additionally comprise saving the original text of request, the selected sequence of templates in a database; and updating statistics for templates, words, animations, the list of unknown words and statistics for unknown words.

According to a second aspect of the present invention, a method is provided for searching an optimum sequence of templates for subsequently selecting animations corresponding to the sequence of templates, said method comprising the steps of:
  (a) selecting all such templates from the whole list of templates to form a sub-list in which all words are included in a sentence, the selection of such templates being performed from templates having animations in a particular style rather than from the whole list of all templates if the particular animation style is preset;
  (b) analyzing the sub-list of templates obtained in step (a) to have the templates ranged according to their hierarchy, the rank of a template being defined by the level of hierarchy;
  (c) excluding the templates with a minimum rank (a higher level) from the sub-list obtained in step (a) if templates belonging to the same hierarchy but having different levels thereof are included in the sub-list;
  (d) selecting an optimum set of templates for which a target function will have the most optimum value from the sub-list of templates obtained in step (c), the target function being presented as:

$$f(x) = k_1 * \frac{1}{N_{crosses}} + k_2 * N_{coverage} + k_3 * N_{rank} +$$
$$k_4 * N_{pairs\ in\ correct\ sequence} - k_4 * N_{pairs\ in\ incorrect\ sequence} \rightarrow MAX,$$

where:

$N_{crosses}$ is a number of crossings of the template words in the set of templates, $N_{coverage}$ is an aggregate coverage of all words by the templates (the number of all words from a sentence, encountered in the templates), $N_{rank}$ is an aggregate rank of all templates from the set, $N_{pairs\ in\ correct\ sequence}$ is a number of word pairs of the composite (i.e., consisting of a few words) templates corresponding to the sequence of words in a phrase, $N_{pairs\ in\ incorrect\ sequence}$ is a number of word pairs of the composite templates not corresponding to the sequence of words in a phrase, and $k_1, k_2, k_3, k_4$ are empirically calculated coefficients. They have a value of 0.4, 0.33, 0.4, 0.2, respectively.

The method of searching an optimum sequence of templates for subsequently selecting animations corresponding to the sequence of templates further comprises searching an optimum value of the target function either by exhausting the possibilities (successively going through all combinations of unique templates) or by means of multicriteria optimization.

The method of searching an optimum sequence of templates for subsequently selecting animations corresponding to the sequence of templates further comprises determining whether any sequences corresponding to the normalized test are available in the cache and selecting a sequence of templates from the cache if is available.

The method of searching an optimum sequence of templates for subsequently selecting animations corresponding to the sequence of templates further comprises determining whether an animation style is set for the original text and selecting animations corresponding to the style if it is set provided that an animation of each template from the sequence is available in this style; or randomly selecting the style for which all animations are available for the selected templates if no such style is set; or randomly selecting any style if there is a number of such styles; or using a selection of animations in various styles if no such styles are available.

The method of searching an optimum sequence of templates for subsequently selecting animations corresponding to the sequence of templates further comprises saving in the database the original text of request and the selected sequence of templates; and updating statistics for templates, words, animations, the list of unknown words and statistics for unknown words.

According to a third aspect of the present invention, a second embodiment is provided of the method of searching an optimum sequence of templates for subsequently selecting animations corresponding to the sequence of templates, said method comprising the steps of:

finding all templates all words of which are found in the phrase being sought by using an algorithm of defining the Levenshtein distance;

sorting the found templates by the number of words in ascending order and sequentially determining, for each template from this formed set of templates, whether a template is a part of any other template from the set, and deleting such a template if this is the case;

defining in the resulting set of templates the templates non-crossing each other and crossing each other;

adding the non-crossing templates to the resulting set;

calculating for each template an average value of the template word positions in the text; and sorting the templates by that average value to obtain an optimum sequence of templates.

The second embodiment of the method of searching an optimum sequence of templates for subsequently selecting animations corresponding to the sequence of templates further comprises determining in the crossing templates the rate of crossing (number of word crosses) the words from the set of non-crossing templates and the number of new words covering the phrase, which are not included in this set.

The second embodiment of the method of searching an optimum sequence of templates for subsequently selecting animations corresponding to the sequence of templates further comprises forming the optimum set of templates from the crossing templates if no non-crossing templates exist, considering the following criteria: maximum aggregate rank, maximum coverage, minimum crosses;

the set of templates being formed by carrying out the following steps:

(a) selecting a first template with a maximum weight, said template weight being the number of words in the template;

(b) selecting templates minimally crossing the first template and non-crossing each other;

(c) selecting from the remaining templates those templates that contain >=50% of new words; in doing so (d) if in step (a) several templates with a maximum weight were available, the set having a maximum difference between the aggregate rank of templates and the number of word crosses is selected as the resulting set of templates.

According to a fourth aspect of the present invention, a method is provided of animating SMS messages, said method comprising the steps of:

receiving an SMS message from a sender;

analyzing the received SMS message by defining the message text;

sending a request containing the text to an animation system;

selecting animations using the above described method of selecting animations corresponding to a text in a natural language;

combining the selected animations and sending same to a service provision system;

forming an MMS containing the received animation and sending same to a recipient.

The method of animating SMS messages further comprises displaying in the SMS message the recipient's phone number and the message text.

The method of animating SMS messages further comprises identifying the sender and the recipient in the received SMS message.

The method of animating SMS messages further comprises sending to the sender an SMS message specifying that the animation has been sent or failed.

According to a fifth aspect of the present invention, a second embodiment of the method of animating SMS messages is provided, said method comprising the steps of:

receiving an SMS message from a subscriber;

analyzing the received SMS message to emphasize the message text;

sending a request with text to an animation system;

selecting an image or an animation using the above described method of selecting animations corresponding to a text in a natural language;

sending the selected image or animation to the service processing system;

forming an MMS containing the image or animation and sending to the subscriber.

The second embodiment of the method of animation of SMS messages further comprises identifying the subscriber in the received SMS message.

The present invention may encompass any combination of the above features or limitations except for combinations of such features which are mutually exclusive.

BRIEF DESCRIPTION OF THE DRAWINGS

The above features and advantages of the present invention will be more clearly understood from the ensuing description accompanied by the drawings, in which.

DETAILED DESCRIPTION OF THE INVENTION

The animation selection algorithm is implemented by an animation system 10 (FIG. 1) within a separate web service 12 realized using the Microsoft ASP.NET technology. The web service refers to the database implemented under the control of the Microsoft SQL Server. The selection of technology (ASP.NET, SQL Server) and way of implementation (web service) is not obligatory. Equally well, the algorithm may be implemented in a window-based application written, for example, in a programming language (c, c#, c++, Pascal and others), and conventional text files may be selected as the database.

Figure 1:
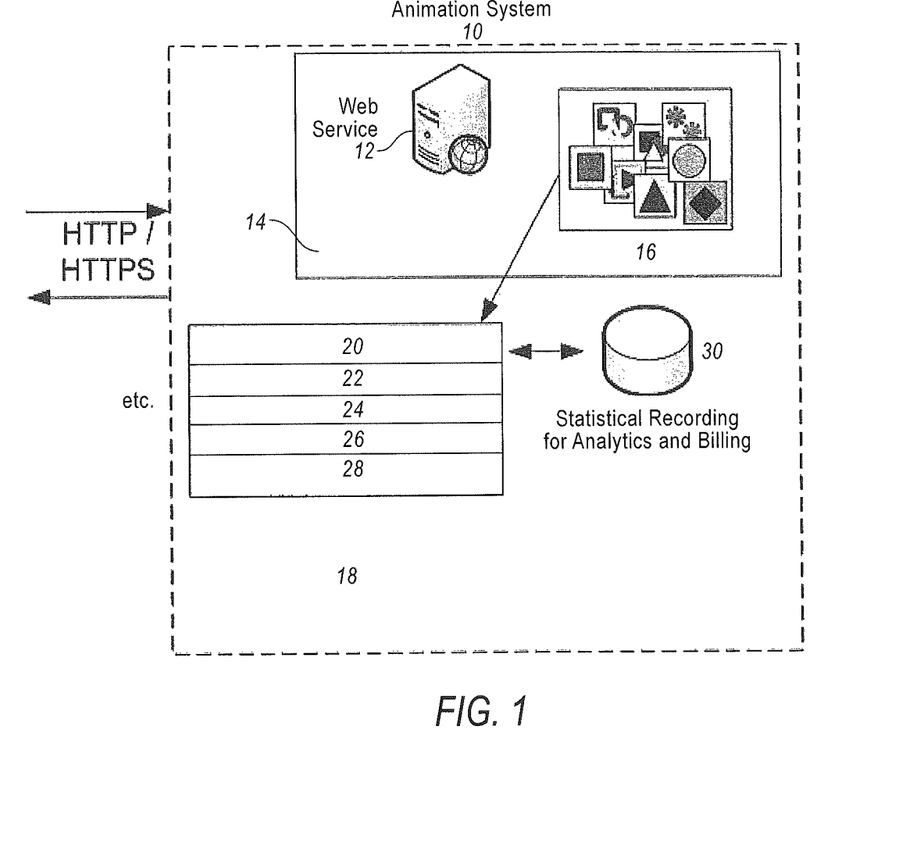
FIG. 1 shows an exemplary implementation of the animation system and FIG. 2 shows an exemplary implementation of the SMS messages animation using the animation system.

The web service comprises a means 14 implementing the animation selection and splicing algorithm working with an animation database 16. Set as text parameters of the message to be animated is a style which the animation has to be selected in (optionally). The algorithm generates a sequence of bytes, i.e., an assembled binary SWF file. The procedure in the animation system 10 is under control of an application 18 providing access to service. Performed particularly, are access to service authentication 20, reception 22 of a text animation request, sending 24 a resulting animation, accumulation 26 of statistics, and content support 28. Also conducted (in 30) is statistical recording for analysis and billing.

The algorithm (method) is unique mainly in that a sequence of animations is selected, semantically corresponding to a specified text. Given a set of animations and a text, the algorithm makes it possible to compare the sequence of these animations to this text. It is unique in that text templates are used, an optimum sequence of these templates is determined, and a style concept is used.

Mode of Operation of the Web Service Performing Text Animation

The idea of the template-based text visualization consists in that the text is manipulated to generate an image or animation with the aid of searching correspondences to a limited number of predefined templates. An animation according to certain style is selected in compliance with each template. Animations are sequentially combined into a single sequence of video images. The text animation algorithms are comprised in the web service developed for solving these tasks. All metadata used in the process of animation (templates, animations, styles, etc.) are stored in the database with which the web service operates.

The animation being generated is a template-based one. Therefore, it is a main object of the service to split the text to be animated into semantically close templates according to a certain sequence, to select the respective animation for each template and to splice the animations into a single clip. The animation may be styled someway (smiley, Disney, Winnie-the-Pooh, Bidstrup, anti-animation, etc.). For testing and deploying the animation service, it is "wrapped" into a web interface whose main object is to generate animations, to administer templates, animations, to accumulate statistics, etc.

In order to determine the structure of the web service, a number of definitions will be introduced.

Style. This is a visual style to satisfy to at the output. For example, smiley, cartoons, serious. There is at least one default style.

Templates. Templates are a set of phrases in the form of "I #to love you", "Hi", "To kiss you". Each template is stored as a selection of normalized words. It means that "To kiss you" is stored instead of "I kiss you". The template is normalized in the step of adding via the web interface. Templates are case-insensitive. The number of interword spaces and word separation by punctuation are ignored.

Group. Groups are preceded by a tag #. A group is a generalization of a number of symbols. For example, #love—love, adore, in love, wild about. Thus, the group #love aggregates the words "adore", "love" and others. The groups make it possible to faster define similar templates. A template not comprising a group has a higher priority in terms of selecting a template.

Animation. A number of animations correspond to each template. Animation has to be specified with reference to the style. A number of animations may exist in the same style. Then, one of them is selected. For each template established in the system, at least one animation in the "on default" style exists unless other style is explicitly established. Template animation—a content file in the swf format (the format may be both vector and bit mapped). The animation has a "background animation" feature defining that the animation is a background one. Non-background animations comprise a transparent background. Some background animations suitable for demonstrating arbitrary foreground animations are neutral background.

Misprints. Misprints may occur in the text to be transmitted. Misprints are corrected by means of the misprinted word=>correct word relationship set in store.

User. A user is the one who makes an animation request by sending a text. It may be a service, web application, etc. The user is entitled to use the service within certain time limits. The user has the authentication data stored in the database. The database also stores the information regarding the time for access availability to the service. A set of allowed animation styles may be associated with the user.

In addition to processing the text animation requests, the web service accumulates statistics (FIG. 1) of the use of templates (frequency), occurrence of words in the text, occurrence of words not found in any template, frequency of the use of styles, frequency of the use of animations. The web service comprises means implementing the text animation selection algorithm and means enabling this animation to be returned to the user or to be sent to the recipient.

Text-Compliant Animation Selection Algorithm

Present at the input of the algorithm are the text and style wherein the respective animations have to be selected (optionally). This data is sent to web service.

1. The input text is split into sentences. Splitting is performed with the aid of standard punctuation separators ("full stop", "interrogation mark", "exclamation mark", "ellipsis"). Splitting is performed by means of a normal search of separators.
2. A sentence is split into parts based on word separators (splitting is performed by means of a normal search). Separators include "full stop", "comma", "space", "colon", "dash", "semicolon". Space, carriage return, tabulation characters are cut off from the resulting words at their beginning and end.
3. If all words in the text are English words, transliteration is performed. This is done by means of a symbol-by-symbol comparison of the sequences of English letters to phonetically close sequences of Russian letters (simple substitution table); if the algorithm is used for an English-language or any other content, transliteration may be omitted.
4. Before subsequent normalization, textual substitutions are made according to the substitution dictionary. It allows the words, word combinations and sentences as well as special characters to be substituted with other characters corresponding to more impressive visualization.
5. Each word is reduced to a normalized form (stemmer). The selection of a particular stemmer is of no special importance. ALP-supported (automated language processing, http://www.aot.ru/) Lucene.NET (http://www.dotlucene.net/) stemmer may be used as an example for normalizing a Russian-language text;
6. The words are checked for standard misprints to replace the misprinted words with the correct ones. A general dictionary of the words (normal forms) included in all sets of templates is maintained and stored in the DB. There are two methods of search and replace:
   a simple replacement method according to a dictionary of misprints, containing correct word meanings from a general dictionary of standard misprints;
   a method of searching a correct word with a minimum Levenshtein distance to the incorrect word being sought for subsequent replacement. Correction of misprints is an optional algorithm step. Correction of misprints may be also performed before the words are normalized.
7. The words that are part of the groups (of the generalization of synonyms) are replaced with the group names. As a group name, a synonym is usually selected. However, the group name may be arbitrary in general.
8. It is checked whether the cache contains the sequence of templates corresponding to the normalized misprint-free text obtained in step 6. If so, a sequence of templates is selected from the cache and the process goes to step 11. For the purpose of the present invention, cache is understood as a set of pairs (corrected normalized text; sequence of templates) stored in the random-access memory (with very short access time), rather than in the database;
9. If no text to be animated is available in the cache, a sequence of templates is selected for the normalized text using the algorithm for selection of templates corresponding to the animation; the sequence of templates is defined by the algorithm for selection of the sequence of templates corresponding to the animation.
10. The resulting sequence of templates is added to the cache by associating it with the text being sought.
11. Steps 2-10 are repeated for each sentence.
12. The sequences of templates for each sentence are combined in a certain order into a single common sequence of templates.
13. If a style is set, animations are selected corresponding to the style provided that for the selected style, an animation of each template from the sequence is available in this style. If no style is set, a style is randomly selected for which all animations are available for the selected templates. If there are a number of such styles, any style is randomly selected. If no styles are available, a selection of animations in various styles is used.
14. An animation is selected for each template in the selected style. If a single template has more than one corresponding animations in one style, a random animation is selected. Animations may be divided (optionally) into foreground and background animations. There are a number of options for "splicing" the animated clips selected into a single one based on the sequence of templates:
   sequential "splicing" of animated files (clips) into a single one, or
   "splicing" of foreground animations at the first or last background animation in the sequence order of "splicing", or
   selecting a random neutral background for displaying foreground animations thereat (background animations are displayed as they are).

All animated clips are scaled according to a maximum duration of clip from the sequence by centering the same (scaling and positioning algorithms may differ). In addition to the resulting clip, sound may be superimposed in the form of an arbitrary audio composition.

15. The "spliced" video clip is converted into an arbitrary, vector or bit mapped, format. For the initial swf animations, it may be, for example, a swf or MPEG file. The type of the output format of the resulting animated file is of no importance.
16. The original text of request, the selected sequence of templates are saved in the database; statistics for templates, words, animations, the list of unknown words and statistics for unknown words are updated.

Algorithm for the Selection of Templates Corresponding to the Animation

The algorithm is used to select animations corresponding to a text.

Algorithm input data: list of templates (is cached upon starting the web service), normalized text of the sentence without misprints. The list of templates is stored in the database in the normalized form.

1. In order to determine the sequence of templates, all templates having all template words included in a sentence are first selected from the list. If a particular animation style is set, the templates are selected from the list of templates having animations in the selected style rather than from the list of all templates.
2. Information regarding the hierarchy of templates is derived from the list of templates. Template A is said to be higher than template B in the hierarchy, if all template A words are included in template B. The hierarchy level determines the template rank.
3. If the templates belonging to the same hierarchy but having different levels are included in a single set of templates obtained in step 1, the templates with a minimum rank (a higher level) are deleted from this set.

4. From the list of templates obtained in step 2, an optimum set of templates is selected, for which a target function will have the optimum value. The target function is given by:

$$f(x) = k_1 * \frac{1}{N_{crosses}} + k_2 * N_{coverage} + k_3 * N_{rank} +$$
$$k_4 * N_{pairs\,in\,correct\,sequence} - k_4 * N_{pairs\,in\,incorrect\,sequence} \to MAX,$$

where:

$N_{crosses}$ is a number of crossings of the template words in the set of templates (for a set of templates "John walked. John ran. Rabbit ran. Ran." the number is 3), $N_{coverage}$ is an aggregate coverage of all words by the templates (the number of all words from a sentence, encountered in the templates), $N_{rank}$ is an aggregate rank of all templates from the set, $N_{pairs\,in\,correct\,sequence}$ is a number of word pairs of the composite (i.e., consisting of a few words) templates corresponding to the sequence of words in a phrase, $N_{pairs\,in\,incorrect\,sequence}$ is a number of word pairs of the composite templates not corresponding to the sequence of words in a phrase, and $k_1$, $k_2$, $k_3$, $k_4$ are empirically calculated coefficients. They have a value of 0.4, 0.33, 0.4, 0.2, respectively.

The value of function depends on a number of mathematical criteria. The function optimum (its maximum value) may be found in a number of ways:

1. by numerical techniques of multicriteria optimization;
2. by means of an exhaustive search of all sets of templates to calculate the target function value for each template.

Simplified Algorithm for Determining the Sequence of Templates Corresponding to the Animation A simplified and faster version of the algorithm for determining the sequence of templates corresponding to the animation is as follows:

1. Using the BlockDistance/Levenshtein edit-distance/Jaro-Winkler distance/Damerau-Levenshtein distance algorithm, all templates are identified wherein all words are in the phrase being sought.

2. The identified templates are sorted in ascending order by the number of words. Sequentially running through this formed set of templates, it is checked whether a template is a part of another template from the set. If so, it is discarded. Thus, a list of templates without enclosures is obtained.

3. In the resulting set of templates, the templates non-crossing each other and crossing each other are defined.

4. (Optional) Determined in the crossing templates is the rate of crossing (number of word crosses) with the words from the set of non-crossing templates and the number of new words covering the phrase, which are not included in this set.

5. Non-crossing templates are added to the resulting set (these are to be definitely included).

6. (Optional) If no non-crossing templates exist, the process goes to step 7. From the remaining crossing templates, a set is attempted to be formed, being optimum by the following criteria: maximum aggregate rank, maximum coverage, minimum crosses. This is done as follows:

6.1 a first template is used with a maximum weight (weight=number of words);

6.2 templates are then used minimally crossing the first template and not crossing each other;

6.3 from the remaining templates, those templates are further selected which contain >=50% of new words: templates are sorted by the number of new words and are added one at a time. In doing so, a test for word novelty is carried out considering the templates being added in the process (i.e., if the first template was added with a number of new words being over 50%, the second template may not be added since considering the words of the first added template the number of new words therein will be less).

6.4 If there are several templates with a maximum rank in step 6.1, then for the set obtained in step 6.3, a value is calculated as follows: aggregate rank of templates minus number of word crosses. Then, the next template with a maximum rank is used and steps 6.2-6.4 are repeated.

6.5. A set of templates is selected with a maximum value calculated in step 6.4.

7. The resulting optimum set of templates has to be transformed into a sequence. To this end, an average value of the template word positions in the text is calculated for each template, and templates are sorted by this average value. The obtained sequence comprises the desired result.

The simplified version of the algorithm may be complicated by adding further criteria, from the complete version of the algorithm, for the search of an optimum sequence of templates.

Algorithm for Determining the Sequence of Templates Corresponding to the Animation In order to determine the sequence of templates, a simple algorithm is used whose input data is a text of a sentence and a set of templates able to form a most full coverage of the sentence.

1. For each template, its mean position in the sentence is calculated: an arithmetic mean of the sequential word numbers in the text. If a template covers several identical words, the first one is used (an embodiment is possible wherein an arithmetic mean of all positions is used).

2. Templates are arranged in ascending order by the mean position in the sentence.

Method of Animation of SMS Messages

Two options are available for the animation of SMS messages.

1. Draw a message to your friends! A person sends an SMS message to a short number, specifying a subscriber to which the message has to be forwarded. The most appropriate animation closest to the message subject is identified and sent to said subscriber. Both a static image and animation may be sent.

2. Visualize your wishes! A person sends an SMS message containing the desired object to a short number and receives a funny picture of this object.

Figure 2:
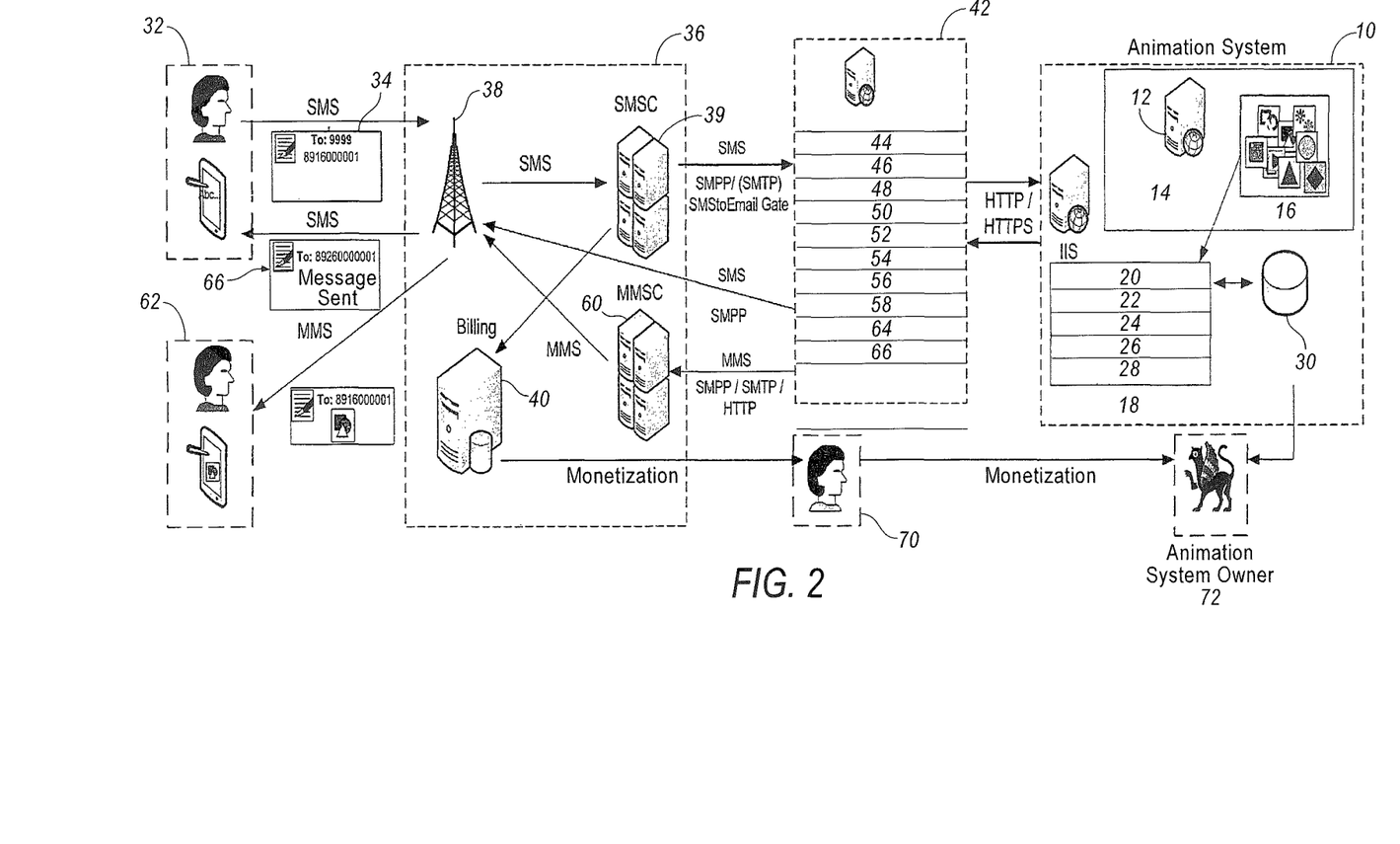

Below is the operating sequence of an embodiment illustrated by FIG. 2 wherein animated messages are used for sending to friends.

1. A sending subscriber 32 sends an SMS message 34 to a short number such as 9999. In the SMS message 34, he includes a receiving subscriber number (for example, 8916000001) and the message text (such as 'Kiss you, my cutie').

2. The message is routed through a mobile network operator's (MNO) equipment 36 represented by a tower 38 to an SMS Center (SMSC) 39 from where the data is provided to a billing system 40 for mutual settlements with service providers and the message itself is forwarded to a service provision system 42 (the use of an intermediate entity (not shown) is possible).

3. The service provision system 42 receives (44) the SMS 34 and analyzes (46) the received SMS message by identifying (48) the sender and defining the message text and defining (50) the receiving subscriber number.

4. The service provision system 42 then makes (52) a request containing the text to the animation system 10.

5. The animation system generates (selects) animation by selecting the respective data from a particular database in the animation database 16.

6. Following the animation searching and assembling algorithm 14, the selected animation templates are spliced and sent to the service provision system 42.

7. The service provision system 42 receives (54) the animation, forms (56) an MMS by packing (56) the received animation into the MMS and sends (58) it via an MMS Center (MMSC) 60 to the receiving subscriber 62.

8. The service provision system sends (64) an SMS message to the sending subscriber 32 via the SMSC 60 saying that the animation has been sent or failed if no MMS has been sent (optionally).

9. The receiving subscriber 62 receives the MMS containing the animated SMS message on behalf (from the number) of the sending subscriber 32.

10. The sending subscriber 32 receives an SMS message 66 notifying of sending (optionally).

11. The service provision system 42 also performs (68) statistical recording for analysis and billing. An owner 70 of the service provision (mobile network operator, content aggregator, etc.) is supposed to interact with an owner 72 of the animation system monetization aspects (mutual settlements with regard to animation generation services based on the number of animation service requests or a monthly fee).

The operating sequence of an embodiment wherein wishes are visualized is somewhat different although the flow chart remains very similar for the participants in the process with the only exception that the receiving subscriber coincides with the sending subscriber.

The sending subscriber 32 sends an SMS message to a short number. He specifies the desired object in the SMS message.

2. The message is routed through the mobile network operator's (MNO) equipment 38 to the SMS Center (SMSC) 39 from where the data is provided to the billing system 40 and the message itself is forwarded to the service provision system 42.

3. The service provision system 42 analyzes the received SMS message by identifying the sender, defining the object to be visualized and forwarding its textual description to the animation system 10.

4. The animation system 10 selects a picture/animation by selecting the respective data from the animation database 16 and sends the same to the service provision system 42.

5. The selected animation is formed into an MMS and sent via the MMS Center (MMSC) 60 to the subscriber 32.

6. The subscriber 32 receives the MMS containing the animated SMS message.

The accompanying drawings illustrate the architecture, functionality and operation of the possible implementations of the systems and methods according to various embodiments of the present invention. Accordingly, each block may comprise a module, a segment or a portion of a code which contains one or more executable commands for implementing a certain logical function(s). It should be also noted that in some alternative embodiments, the functions designated in the block may be performed in an order other than that shown in the drawings. For example, two blocks shown in series may actually be executed in a reverse order depending in the enabled functionality. It should be also noted that each illustrated block and combinations of blocks in the drawings may be implemented either as specialized hardware-based systems and modules which perform specialized functions or actions, or as combinations of the specialized hardware and computer commands.

The terminology used herein is for the purpose of describing particular embodiments only and is not intended to limit the invention to the particularly provided example. As used herein, the singular forms "a", "an" and "the" are intended to include the plural forms as well, unless the context clearly indicates otherwise. It will be further understood that the terms "comprises" and/or "comprising", "includes" and/or "including" when used in this specification, specify the presence of stated features, integers, steps, operations, elements, and/or components, but do not preclude the presence or addition of one or more other features, integers, steps, operations, elements, components and/or groups thereof.

While particular embodiments of the invention have been illustrated and described above, it will be apparent to those of ordinary skill in the art that any configuration designed for achieving the same object may be presented instead of the particularly shown embodiments and that the invention has other applications in other environments. The present disclosure is intended to encompass any adaptations or variations of the present invention. The following claims are by no means intended for limiting the scope of invention to particular embodiments described herein.

The invention claimed is:

1. A method for animating messages in a natural language, said method comprising the steps of:

providing a natural language text message to be animated;
dividing said text into sentences;
dividing said sentences into words;
reducing each word to a normalized form;
selecting a sequence of templates for a normalized text;
combining the sequences of templates for each sentence in a certain order into a single common sequence of templates;
selecting an animation for each template;
combining the selected animation files into a resulting clip,
wherein said combining the sequences of templates for each sentence in a certain order into a single common sequence of templates comprises the steps of:
(a) selecting from a list all templates having all template words included in a sentence;
(b) deriving from the list of templates obtained in the previous step (a) information regarding hierarchy of the templates, the template hierarchy level determining a template rank;
(c) excluding the templates with a minimum rank from the list of templates obtained in the step (a) if templates belonging to the same hierarchy but having different levels are included in a single set of templates obtained in the step (a);
(d) selecting from the list of templates obtained in the step (c), an optimum set of templates for which a target function has the maximum value, wherein the target function is given by:

$$f(x) = k_1 \cdot \frac{1}{N_{crosses}} + k_2 \cdot N_{coverage} + k_3 \cdot N_{rank} +$$
$$k_4 \cdot N_{pairs\,in\,correct\,sequence} - k_4 \cdot N_{pairs\,in\,incorrect\,sequence} \to MAX$$

where:

$N_{crosses}$ is a number of crossings of the template words in the set of templates, $N_{coverage}$ is an aggregate coverage of all words by the templates (number of all words from a sentence, encountered in the templates), $N_{rank}$ is an aggregate rank of all templates from the set, $N_{pairs\,in\,correct\,sequence}$ is a number of word pairs of the composite (i.e., consisting of a few words) templates corresponding to the sequence of words in a phrase, $N_{pairs\,in\,incorrect\,sequence}$ is a number of word pairs of the composite templates not corresponding to the sequence of words in a phrase, and $k_1$, $k_2$, $k_3$, $k_4$ are empirically calculated coefficients having values of 0.4, 0.33, 0.4, 0.2, respectively.

2. The method of claim 1, wherein words, phrases and symbols are formally replaced with predefined words, phrases or symbols equivalent thereto.

3. The method of claim 1, wherein misprints are corrected in the words.

4. The method of claim 1, wherein neutral background animations for each template are selected.

5. The method of claim 1, further determining whether any sequences of templates corresponding to the normalized text are available in the cache, and selecting same from the cache if available.

6. The method of claim 1, further determining whether an animation style is preset for the text provided and performing either of the following:
  selecting animations corresponding to the style which is of each template from the sequence is available in this style; or
  selecting animations from a randomly selected style for which all animations are available for the selected templates if no style is preset; or
  selecting animations from a randomly selected style if there is a number of such styles for which all animations are available for the selected templates, any style is randomly selected; or
  selecting animations from various styles if no styles are available for which all animations are available for the selected templates.

7. The method of claim 1, further comprising saving in a database an original text of request and the selected sequence of templates; and updating statistics for templates, words, animations, the list of unknown words and statistics for unknown words.

8. The method of claim 1, wherein the maximum value of the target function is searched either by means of an exhaustive search of the sequence of templates (successively going through all combinations of unique templates) or by means of multicriteria optimization.

9. A method for animating messages in a natural language, said method comprising the steps of:
  providing a natural language text message to be animated;
  dividing said text into sentences;
  dividing said sentences into words;
  reducing each word to a normalized form;
  selecting a sequence of templates for a normalized text;
  combining the sequences of templates for each sentence in a certain order into a single common sequence of templates;
  selecting an animation for each template;
combining the selected animation files into a resulting clip,
  wherein said combining the sequences of templates for each sentence in a certain order into a single common sequence of templates comprises the steps of:
  finding all templates all words of which are found in the phrase being sought by using the Levenshtein edit-distance algorithm;
  sorting the found templates by the number of words in ascending order and sequentially determining for each template from this formed set of templates, whether the template is a part of (included in) any other template from the set, and deleting the included templates;
  in the resulting set of templates, defining the templates non-crossing each other and crossing each other;
  adding the non-crossing templates to a resulting set;
  calculating for each template an average value of the template word positions in the text; and
  sorting the templates by that average value to obtain an optimum sequence of templates, and
  wherein if no non-crossing templates exist, an optimum set of templates is formed from the crossing templates by carrying out the steps of:
  (aa) selecting a first template with a maximum weight, said template weight being the number of words in the template;
  (bb) selecting templates minimally crossing the first template and non-crossing each other;
  (cc) selecting from the remaining templates those templates that contain >=50% of new words; wherein
  (d) if in the step (aa) a few templates with a maximum weight are available, selecting as the resulting set of templates the set having a difference between the aggregate rank of templates and the number of word crosses which is larger than same for other sets.

* * * * *

UNITED STATES PATENT AND TRADEMARK OFFICE
CERTIFICATE OF CORRECTION

PATENT NO. : 9,824,479 B2  
APPLICATION NO. : 13/812802  
DATED : November 21, 2017  
INVENTOR(S) : Bekmambetov et al.

Page 1 of 1

It is certified that error appears in the above-identified patent and that said Letters Patent is hereby corrected as shown below:

On the Title Page

Insert:
--(73) Assignee: Bazelevs Innovations Ltd.--

Signed and Sealed this  
Seventh Day of August, 2018

Andrei Iancu  
*Director of the United States Patent and Trademark Office*